United States Patent [19]
Obermeyer et al.

[11] Patent Number: 5,357,547
[45] Date of Patent: Oct. 18, 1994

[54] VIBRATION DAMPENER FOR DAMPENING VIBRATION OF A TUBULAR MEMBER

[75] Inventors: Franklin D. Obermeyer; Willis B. Middlebrooks, both of Pensacola, Fla.; Edmund E. DeMario, Columbia, S.C.

[73] Assignee: Westinghouse Electric Corporation, Pittsburgh, Pa.

[21] Appl. No.: 853,556

[22] Filed: Mar. 18, 1992

[51] Int. Cl.$^5$ .............................................. G21C 17/00
[52] U.S. Cl. ..................................... 376/254; 376/292
[58] Field of Search ............... 376/254, 292, 434, 285; 976/DIG. 235

[56] References Cited

U.S. PATENT DOCUMENTS

| | | | |
|---|---|---|---|
| 4,504,437 | 3/1985 | Underwood et al. | 376/153 |
| 4,702,881 | 10/1987 | Weiland et al. | 376/442 |
| 4,716,004 | 12/1987 | Merkosky et al. | 376/203 |
| 4,751,039 | 6/1988 | Delevallee et al. | 376/261 |
| 4,778,647 | 10/1988 | Gasparro | 376/347 |
| 4,839,135 | 6/1989 | Merkovsky | 376/254 |
| 4,897,239 | 1/1990 | Planchard et al. | 376/254 |
| 4,933,137 | 6/1990 | Murakami et al. | 376/434 |
| 4,990,304 | 2/1991 | Rylatt | 376/434 |

FOREIGN PATENT DOCUMENTS

784495  7/1923  United Kingdom .

*Primary Examiner*—Donald P. Walsh
*Assistant Examiner*—Meena Chelliah
*Attorney, Agent, or Firm*—Walter S. Stevens

[57] ABSTRACT

Vibration dampener for dampening vibration of a tubular member, such as an instrumentation tube of the type found in nuclear reactor pressure vessels. The instrumentation tube is received in an outer tubular member, such as a guide thimble tube. The vibration dampener comprises an annular sleeve which is attachable to the inside surface of the guide thimble tube and which is sized to surround the instrumentation tube. Dimples are attached to the interior wall of the sleeve for radially supporting the instrumentation tube. The wall of the sleeve has a flexible spring member, which is formed from the wall, disposed opposite the dimples for biasing the instrumentation tube into abutment with the dimples. Flow-induced vibration of the instrumentation tube will cause it to move out of contact with the dimples and further engage the spring member, which will flex a predetermined amount and exert a reactive force against the instrumentation tube to restrain its movement. The amount by which the spring member will flex is less than the unrestrained amplitude of vibration of the instrumentation tube. The reactive force exerted against the instrumentation tube will be sufficient to return it to its original axial position within the thimble tube. In this manner, vibration of the instrumentation tube is dampened so that in-core physics measurements are accurate and so that the instrumentation tube will not wear against the inside surface of the guide thimble tube.

4 Claims, 11 Drawing Sheets

VIBRATION DAMPENER FOR DAMPENING VIBRATION OF A TUBULAR MEMBER

This invention was conceived in the course of, or under Contract Number DE-AC03-86-SF18495 between Westinghouse Electric Corporation and the United States Government, acting through the Department of Energy. The Government may have rights in this patent application and any patent issuing thereon.

BACKGROUND OF THE INVENTION

This invention generally relates to antivibration apparatus and more particularly relates to a vibration dampener for dampening the vibration of a tubular member, such as an instrumentation tube of the type typically found in nuclear power reactor pressure vessels.

However, before discussing the current state of the art, it is instructive first to briefly describe the structure and operation of a typical nuclear power reactor, which contains tubular members, such as instrumentation tubes. In this regard, a nuclear power reactor is a device for producing heat by the controlled fission of fissionable material. The fissionable material is in the form of fuel pellets disposed in an elongated hollow rod which serves as cladding for the fuel pellets. A plurality of the elongated rods are bundled together by a plurality of spaced-apart grids having open cells therein for receiving each fuel rod therethrough. Moreover, a plurality of elongated movable control rods slidably extend through preselected ones of the grid cells, not containing fuel rods, for controlling the fission process. A plurality of these fuel rod assemblies are grouped to define a nuclear reactor core, which is sealingly enclosed within a reactor pressure vessel. Liquid moderator coolant (i.e., demineralized water) is caused to flow past the rods of each fuel assembly for assisting in the fission process and for removing the heat produced by the fission process. The heat carried away by the liquid moderator coolant is ultimately transferred to a turbine-generator for generating electricity in a manner well known in the art of electric power generation.

Disposed in the reactor pressure vessel are an upper core plate and an upper support plate that is spaced above the upper core plate, the upper support plate and the upper core plate being horizontally disposed in the reactor pressure vessel. Each fuel assembly is vertically spaced apart from and located below the upper core plate. Moreover, vertically extending through the upper core plate and into each fuel assembly is at least one elongated instrumentation tube that houses at least one detector to measure desired core physics quantities (e.g., neutron flux) in the fuel assembly.

However, during normal operation of the reactor, the liquid moderator coolant circulating in the reactor pressure vessel causes vibration of the internal components, including the instrumentation tubes, which are disposed in the pressure vessel. Moreover, off-normal operation caused by seismic events and postulated accidents (e.g., loss-of-coolant accident) also causes vibration of the internal components, including the instrumentation tubes. It is desirable to dampen the vibration of the instrumentation tubes during normal and off-normal conditions because excessive vibration may lead to inaccurate measurement of core physics values and premature wear of the instrumentation tube.

Therefore, a problem in the art is to provide means for dampening vibration (i.e., decreasing the amplitude of vibration) of the instrumentation tube when the instrumentation tube is subjected to the normal vibrations caused by routine operation of the reactor and when the instrumentation tube is subjected to off-normal vibrations caused by seismic events and postulated accidents.

Anti-vibration devices are known. One such device is disclosed in U.S. Pat. No. 4,990,304 entitled "Instrumentation Tube Features For Reduction Of Coolant Flow-Induced Vibration Of Flux Thimble Tube" issued Feb. 5, 1991 in the name of John A. Rylatt and assigned to the assignee of the present application. This patent discloses dimples formed in an instrumentation tube to constrain a flux thimble tube within the instrumentation tube, the flux thimble tube containing a neutron flux detector. This patent also discloses inwardly-projecting spring fingers formed in the instrumentation tube to contact the flux thimble tube. Although this patent discloses dimples and spring fingers to constrain a flux thimble tube within an instrumentation tube, this patent does not appear to disclose a vibration dampener for dampening the vibration of a tubular member, as described and claimed herein.

Therefore, what is needed is a vibration dampener for dampening the vibration of a tubular member, such as an instrumentation tube of the type typically found in nuclear reactor pressure vessels.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings wherein:

SUMMARY OF THE INVENTION

Disclosed herein is a vibration dampener for dampening the vibration of a tubular member. The vibration dampener of the present invention comprises a sleeve having a wall for surrounding the tubular member, the wall having a pair of spaced-apart slots therethrough; support means attached to the wall for supporting the tubular member; and biasing means formed from the wall and interposed between the slots for biasing the tubular member into abutment with the support means, the biasing means having a first end portion and a second end portion thereof attached to the wall.

More specifically, the invention is a vibration dampener for dampening vibration of a tubular member, such as an instrumentation tube of the type typically found in nuclear reactor pressure vessels. The instrumentation tube, which contains at least one in-core physics measuring device, is received in an outer tubular member, such as a guide thimble tube. The vibration dampener comprises an annular sleeve which is attachable to the inside surface of the guide thimble tube and which is sized to surround the instrumentation tube. Dimples are attached to the interior wall of the sleeve for radially supporting the instrumentation tube. The wall of the sleeve has a spring member, which is formed from the wall, disposed opposite the dimples for biasing the instrumentation tube into abutment with the dimples. Flow-induced vibration of the instrumentation tube will cause it to move out of contact with the dimples to deflect the spring member, which will flex a predetermined amount and exert a reactive force against the instrumentation tube. The reactive force exerted against the instrumentation tube will be sufficient to return it to its original axial position within the guide thimble tube in a manner that reduces the amplitude of vibration of the instrumentation tube. In this manner, vibration of the instrumentation tube is dampened (i.e., amplitude of vibration is reduced) so that in-core physics measurements are accurate and so that the instrumentation tube will not prematurely wear against the inside surface of the guide thimble tube.

An object of the present invention is to provide a vibration dampener for dampening flow-induced vibration of a tubular member, such as an instrumentation tube of the type typically found in nuclear reactor pressure vessels.

Another object of the present invention is to provide a vibration dampener capable of dampening vibration (i.e., reducing the amplitude of vibration) of the tubular member as the tubular member vibrates within an outer tube, such as a guide thimble tube.

A feature of the present invention is the provision of a sleeve to surround the inner tubular member, the sleeve being attachable to the inside surface of the outer tube and having dimples and spring members formed from the wall thereof for dampening the vibration of the inner tubular member.

An advantage of the present invention is that flow-induced vibration of the instrumentation tube (i.e., inner tubular member) is dampened as the dimples abut the instrumentation tube and as the spring member flexibly biases the instrumentation tube into abutment with the dimples, so that core physics quantities (e.g., neutron flux) are accurately measured and so that the instrumentation tube does not vibrate against the inside surface of the outer tube and experience premature wear.

DESCRIPTION OF THE PREFERRED EMBODIMENT

Nuclear reactor pressure vessels contain internal components, such as instrumentation tubes for measuring core physics quantities such as neutron flux. However, during normal operation of the reactor, the liquid coolant circulating in the pressure vessel causes vibration of the internal components, including the instrumentation tubes. Moreover, off-normal operation caused by seismic events and postulated accidents (e.g., loss-of-coolant accident) also causes vibration of the internal components, including the instrumentation tubes. It is desirable to dampen vibration of the instrumentation tube during normal and off-normal operating conditions because excessive vibration may lead to inaccurate measurement of the core physics values and premature wear of the instrumentation tube. Therefore, disclosed herein is a vibration dampener for dampening the vibration of a tubular member, such as an instrumentation tube of the type typically found in nuclear reactor pressure vessels.

However, before describing the subject matter of the present invention, it is instructive first to briefly describe the structure and operation of a typical nuclear power reactor.

Figure 1:
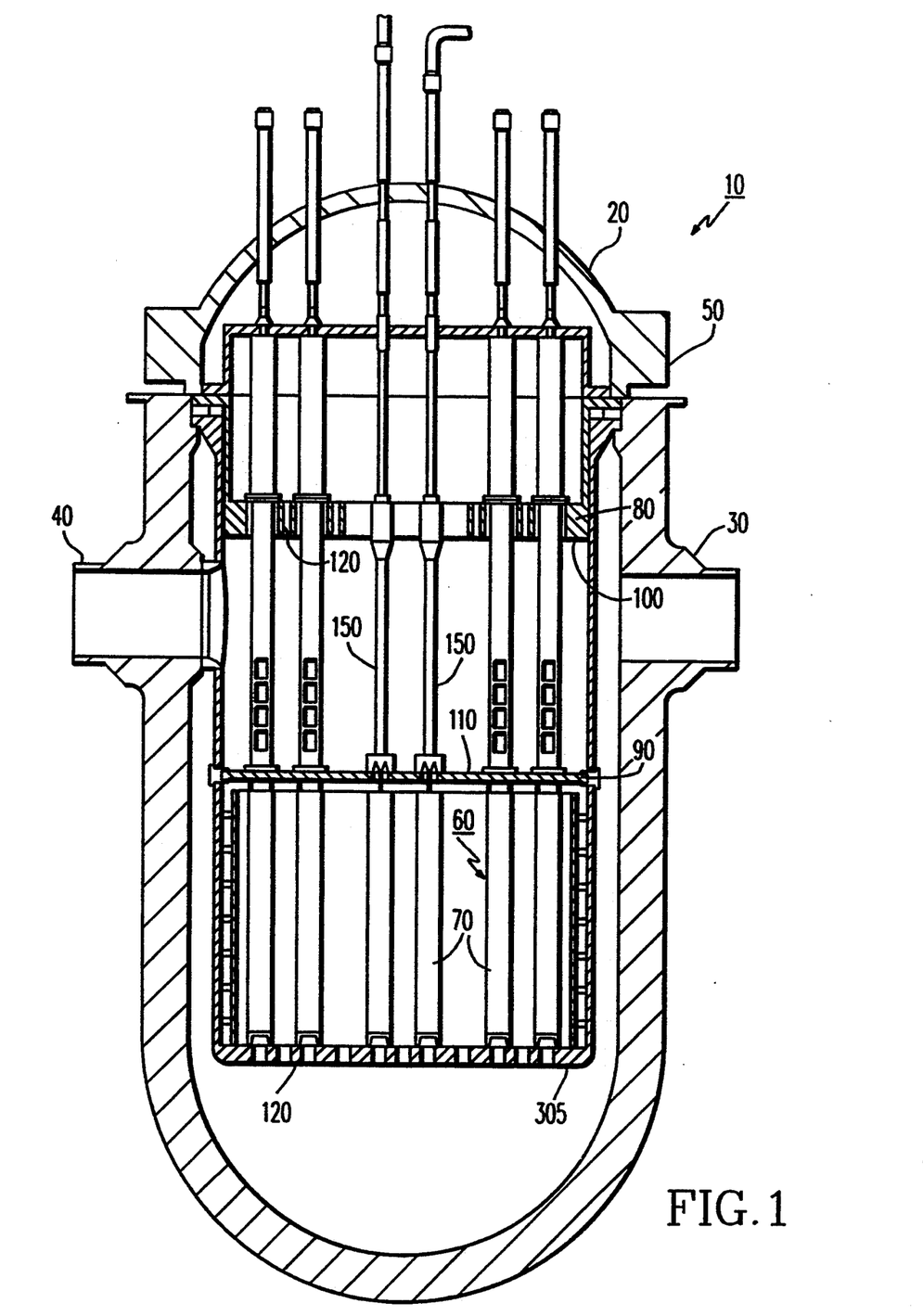
FIG. 1 shows in partial vertical section, a typical nuclear reactor pressure vessel with parts removed for clarity.
Figure 2:
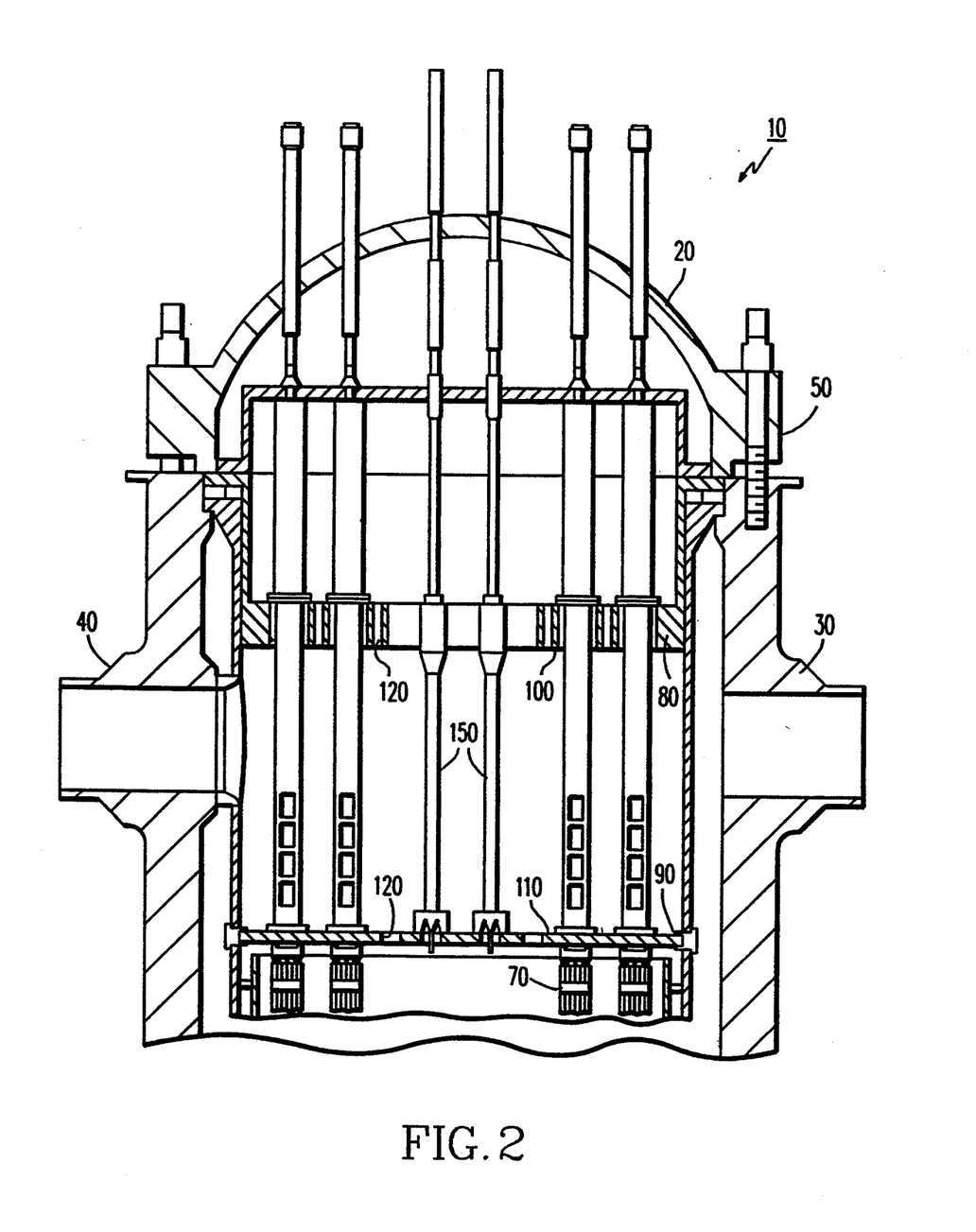
FIG. 2 shows in partial vertical section, the upper internal structure of the pressure vessel, the upper internal structure including a support column interposed between an upper support plate and an upper core plate and also shows a plurality of fuel assemblies disposed below the upper core plate.
Figure 3:
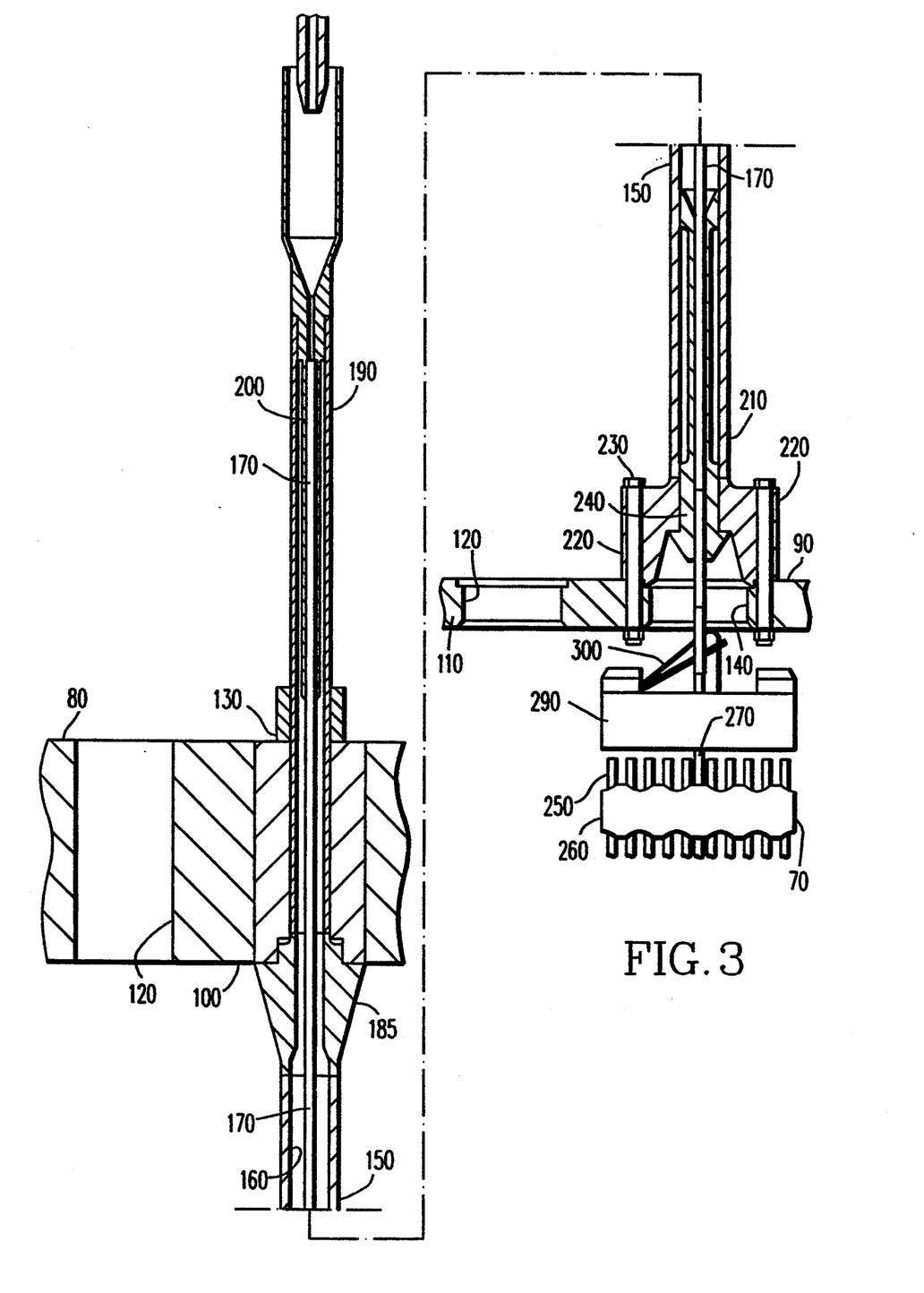
FIG. 3 shows the support column in vertical section and interposed between the upper support plate and the upper core plate and also shows one of the fuel assemblies spaced below the upper core plate.
Figure 4:
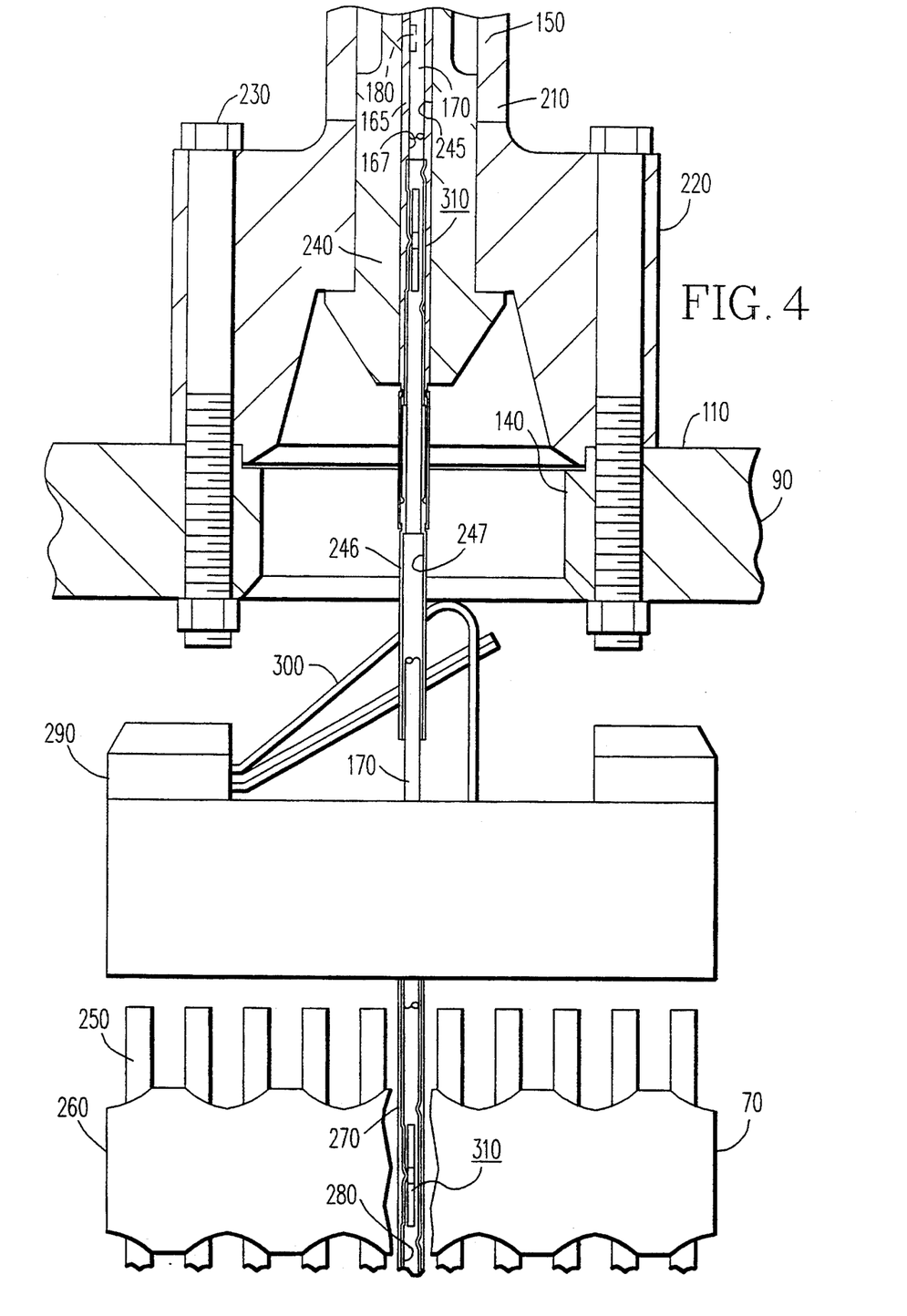
FIG. 4 shows in vertical section, the vibration dampener of the invention disposed in the support column and also disposed in a guide thimble tube that extends into the fuel assembly.
Figure 4A:
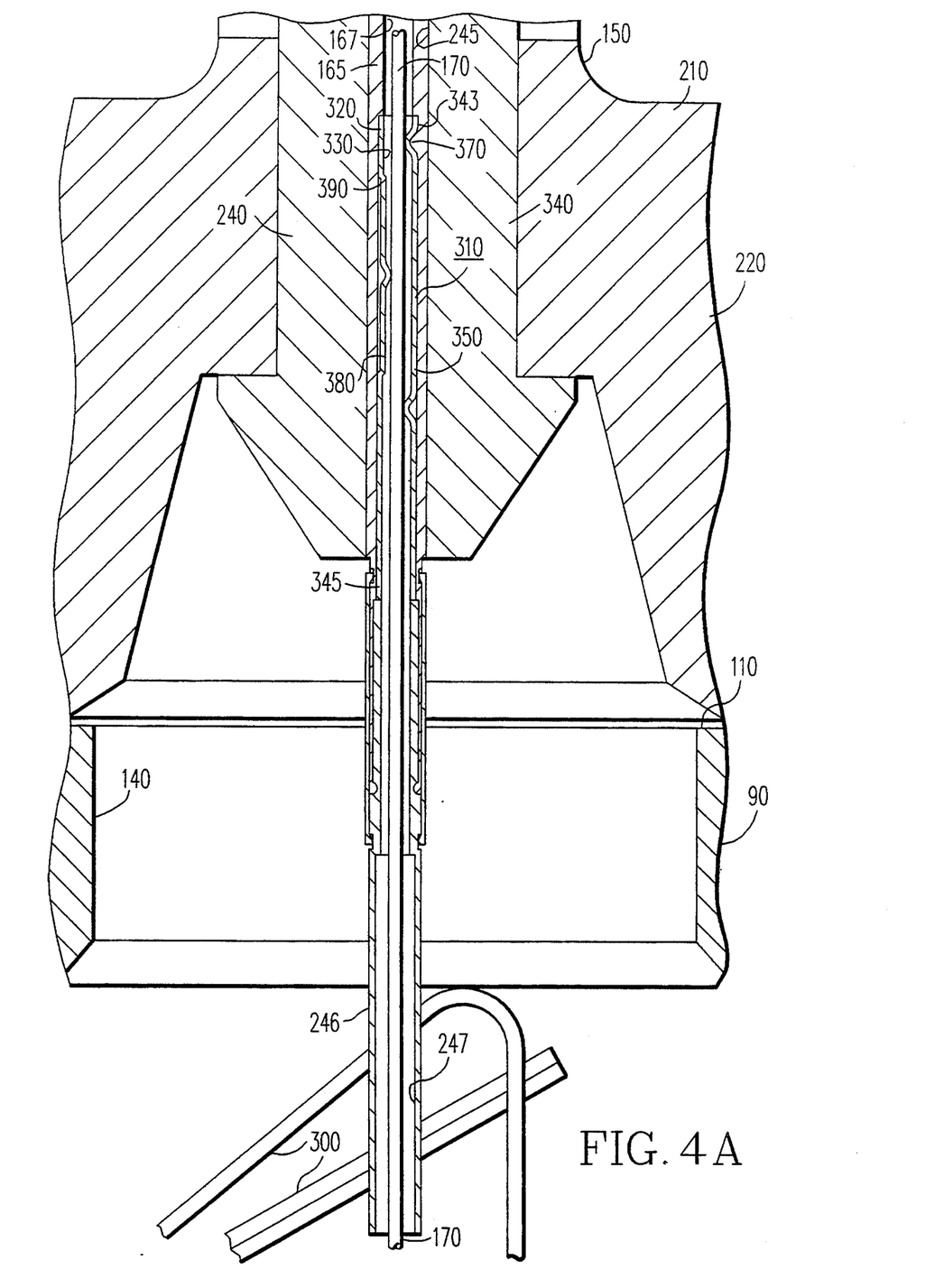
FIG. 4A shows in vertical section, the vibration dampener disposed in the support column.
Figure 4B:
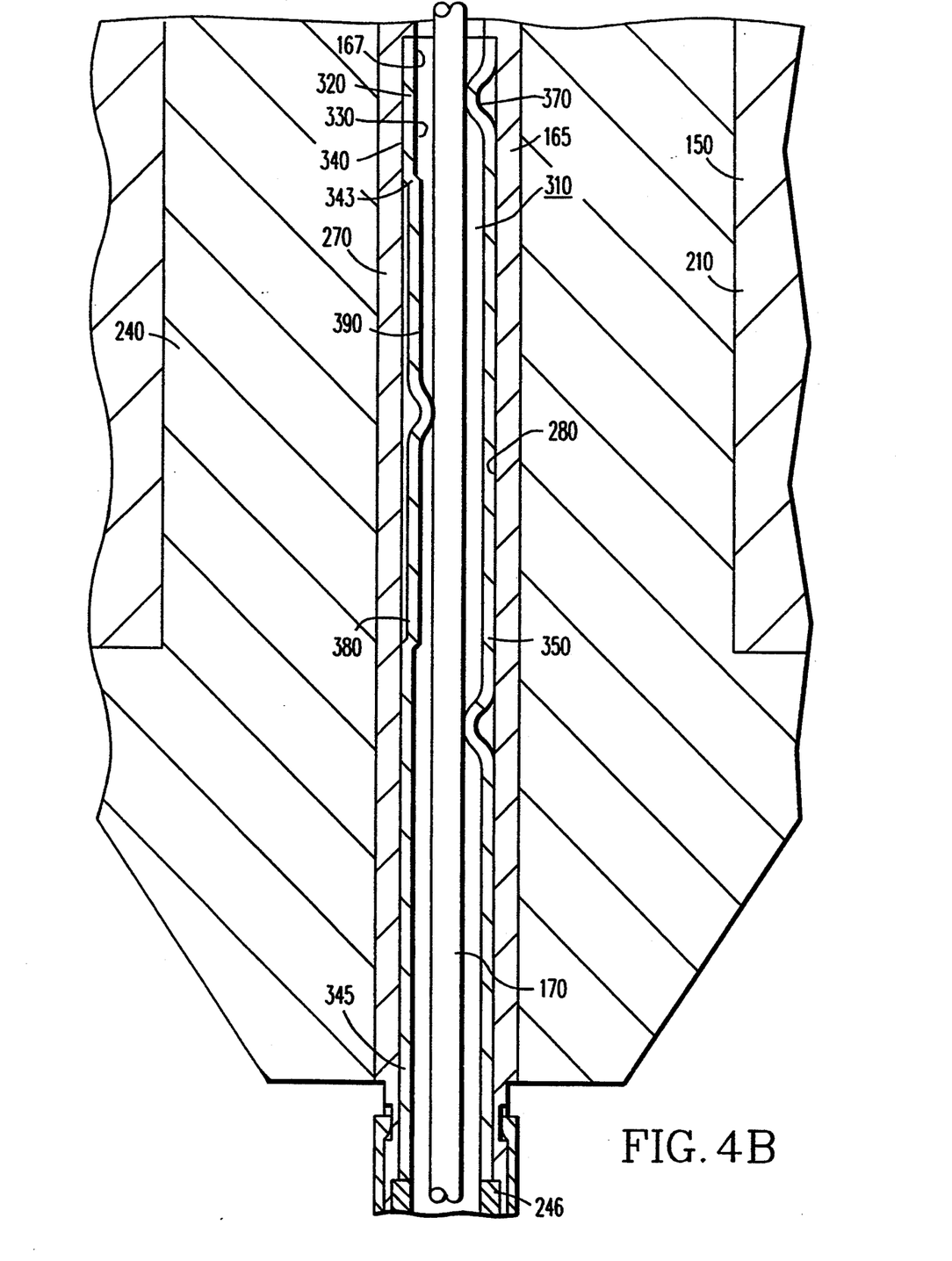
FIG. 4B is a fragmentation view in vertical section of the vibration dampener disposed in the support column, the vibration dampener including a spring member in an undeflected position.
Figure 4C:
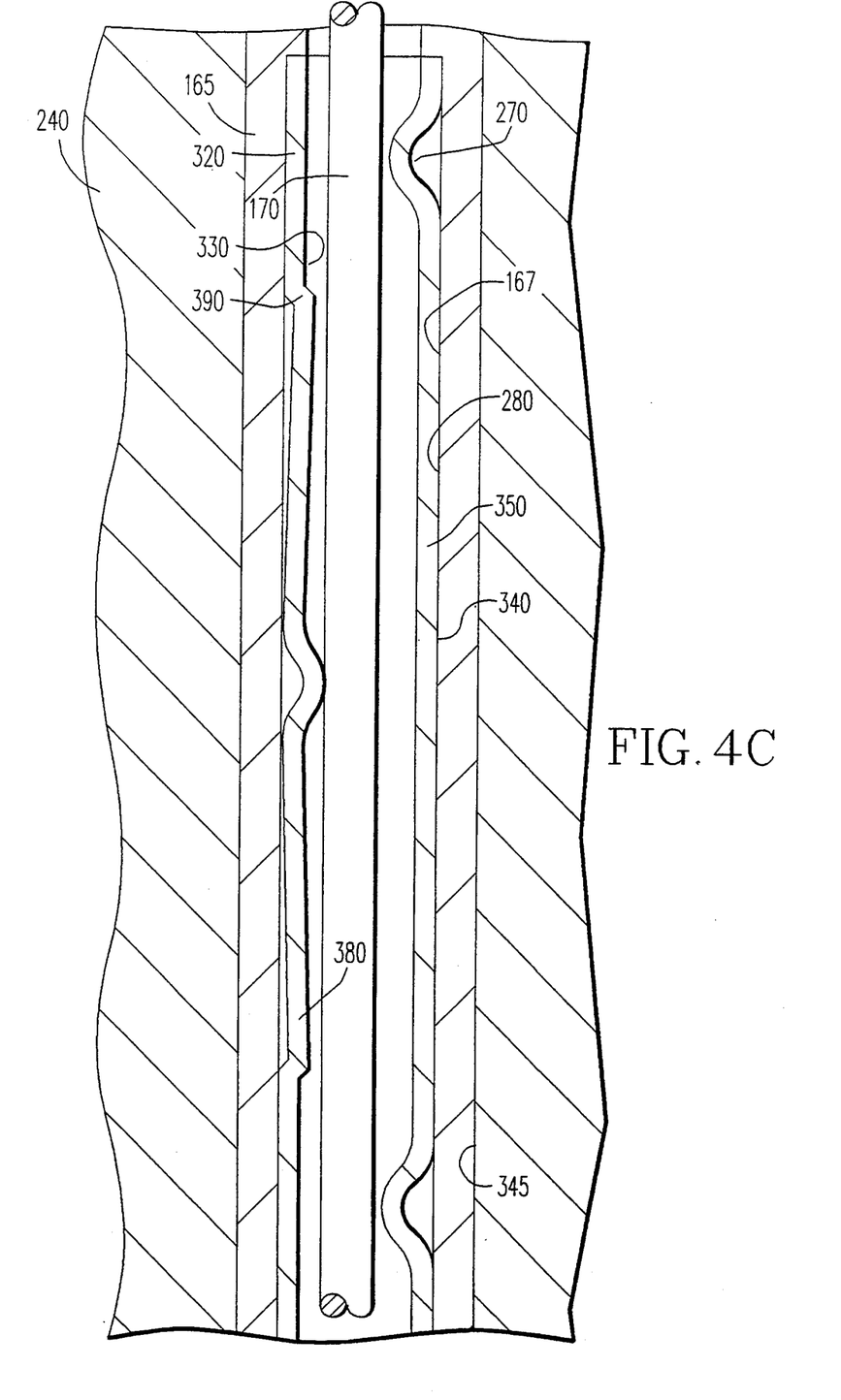
FIG. 4C is a fragmentation view in vertical section of the vibration dampener disposed in the support column, the vibration dampener including a spring member in a deflected position.
Figure 5:
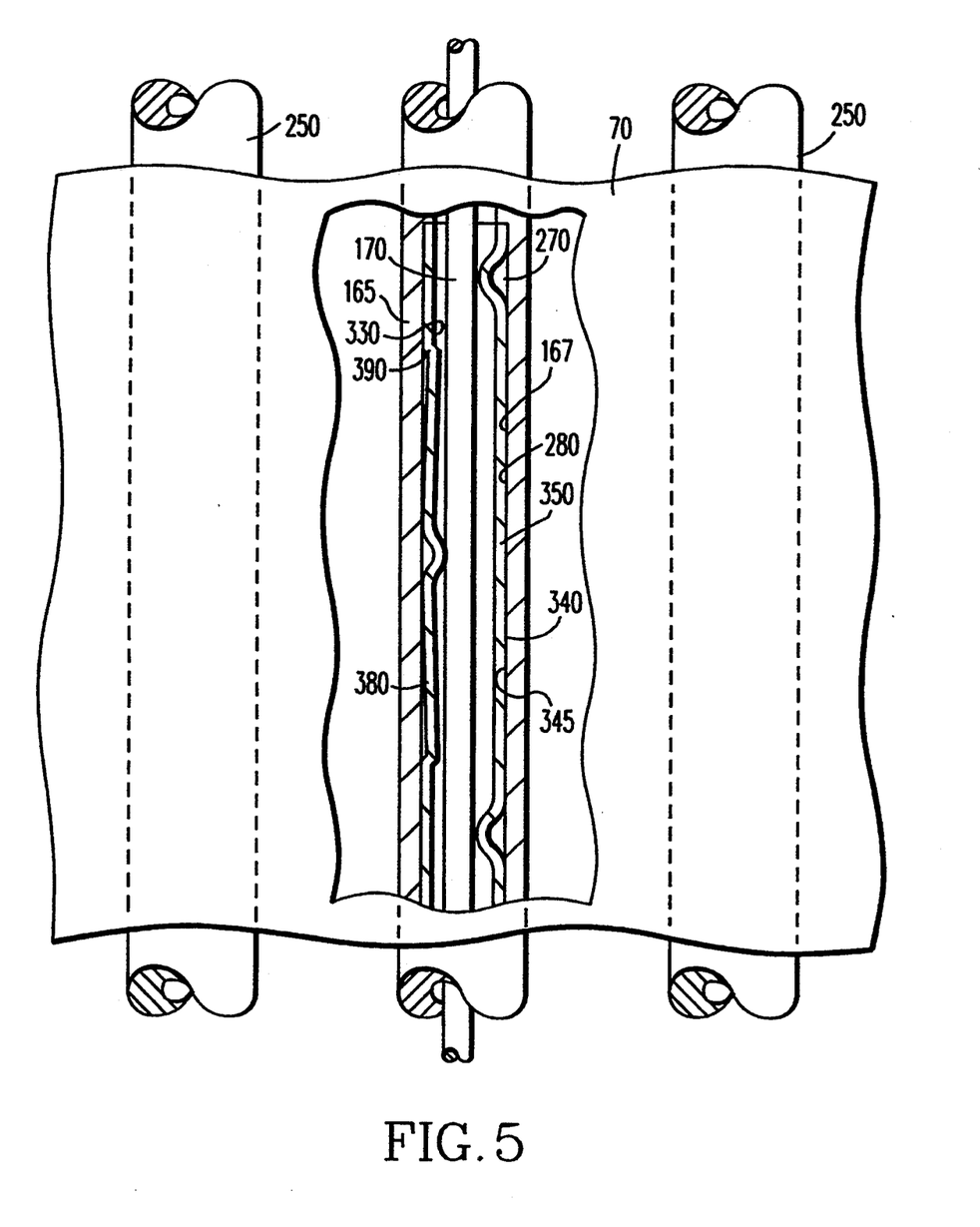
FIG. 5 shows in vertical section, the vibration dampener disposed in the guide thimble tube.
Figure 6:
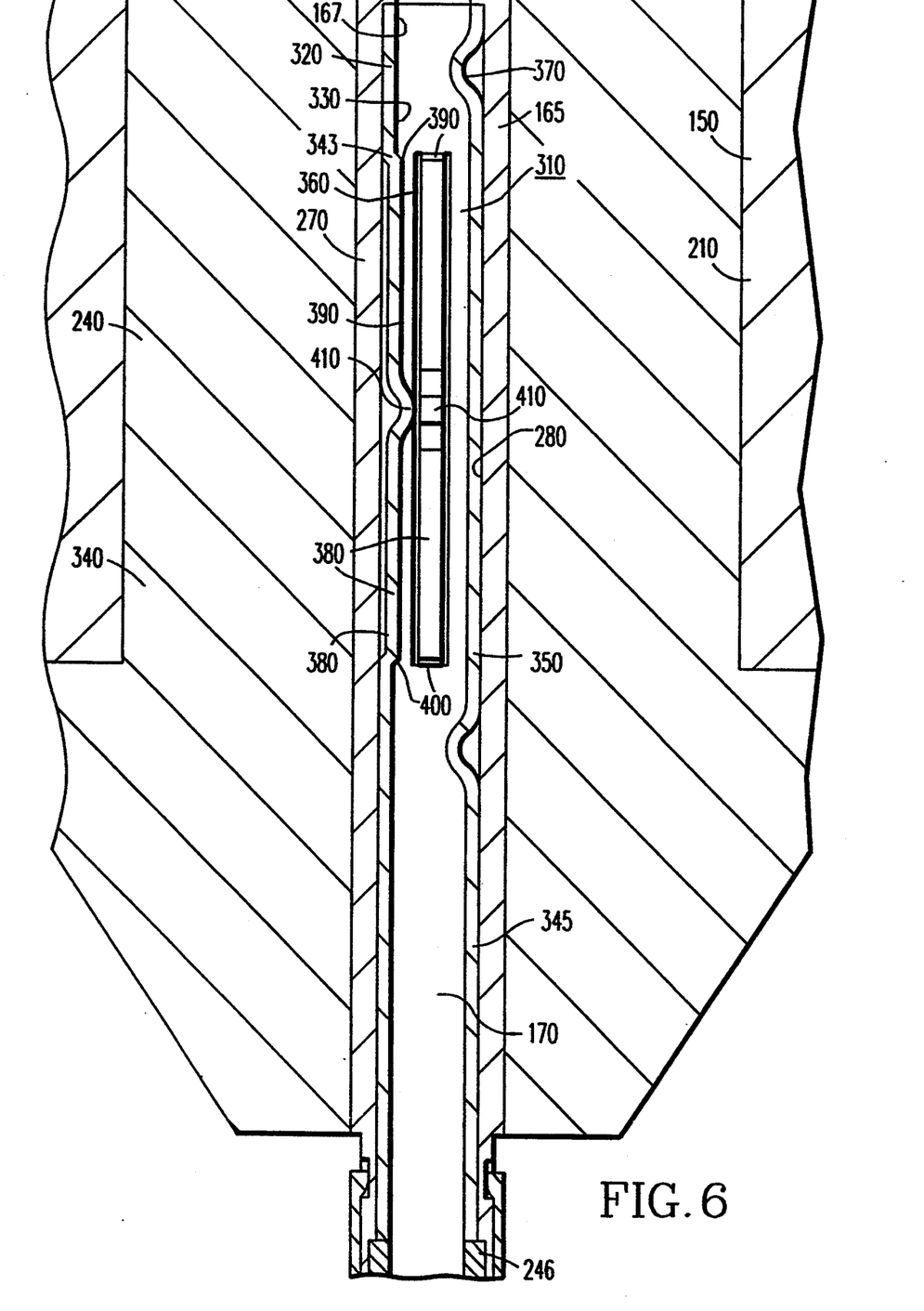
FIG. 6 shows in vertical section, the vibration dampener belonging to the support column.
Figure 6A:
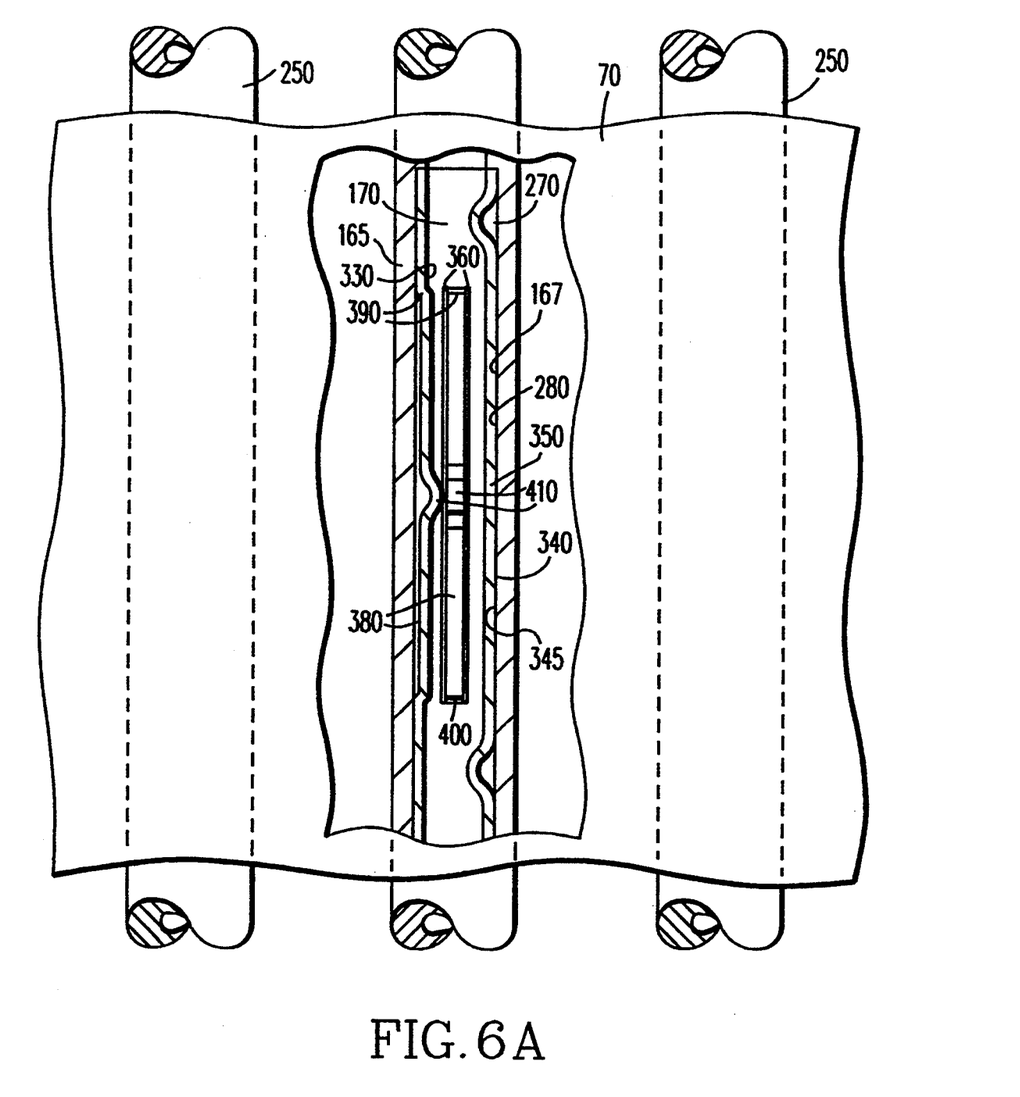
FIG. 6A shows in vertical section, the vibration dampener belonging to the guide thimble tube.
Figure 7:
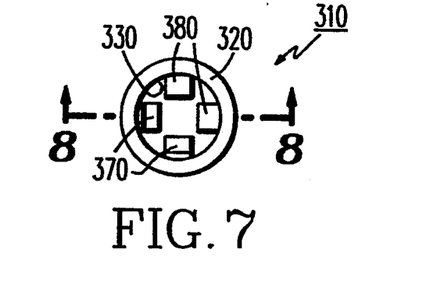
FIG. 7 is a plan view of the vibration dampener.
Figure 8:
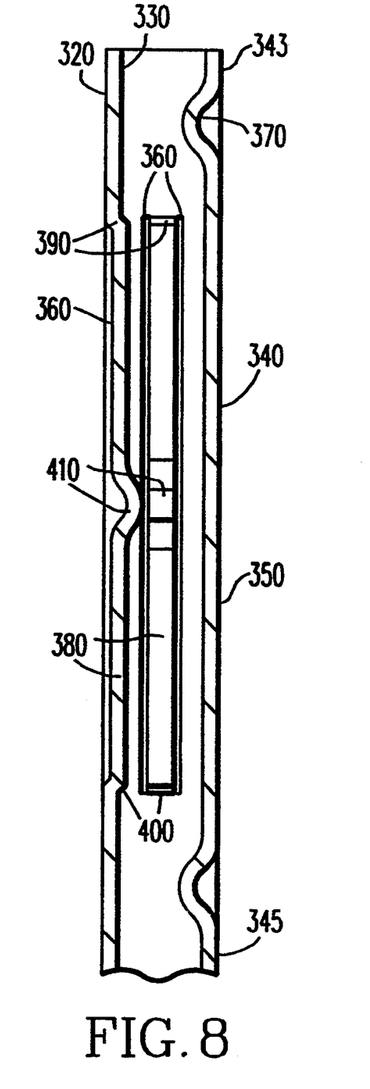
FIG. 8 is a view of the vibration dampener along section line VIII—VIII of FIG. 7.

Therefore, referring to FIGS. 1 and 2, there is shown a typical nuclear power reactor, generally referred to as 10, for producing heat by the controlled fission of fissionable nuclear fuel material (not shown). Reactor 10 includes a generally cylindrical vertically-oriented reactor pressure vessel shell 20 open at its top end and having a plurality of inlet nozzles 30 and outlet nozzles 40 attached to the upper portion thereof (only one of each nozzle is shown). A hemispherical closure head 50 is mounted atop vessel shell 20 and is sealingly attached, which may be by bolting, to the open top end of vessel shell 20, so that closure head 50 sealingly caps vessel shell 20. Capping vessel shell 20 in this manner allows for suitable pressurization of the coolant within vessel shell 20 as reactor 10 operates.

Still referring to FIGS. 1 and 2, contained in reactor 10 is a nuclear reactor core, generally referred to as 60, having the nuclear fuel disposed in a plurality of fuel assemblies 70. A control rod drive shaft (not shown) engages a plurality of movable control rods (not shown) for controlling the fission process in fuel assemblies 70 in a manner well known in the art of nuclear power production. Disposed inwardly of vessel shell 20 is a horizontal upper support plate 80 that transmits loads from the core and other internal components to the pressure vessel wall and a horizontal upper core plate 90 that supports and locates the top of fuel assemblies 70, which upper core plate 90 is spaced below upper support plate 80. Upper support plate 80 has a bottom surface 100 and upper core plate 90 has a top surface 110 thereon. Moreover, upper support plate 80 and upper core plate 90 each has a multiplicity of coolant flow orifices 120 for flow of liquid moderator coolant (i.e., demineralized water) therethrough, which coolant removes the heat produced by fission of the fissionable fuel material contained in fuel assemblies 70 and which also assists the fission process. Upper support plate 80 also has a plurality of internally threaded apertures 130 for reasons provided hereinbelow. Moreover, upper core plate 90 has a plurality of instrumentation holes 140 therethrough for reasons disclosed presently.

Referring to FIGS. 2, 3, 4, 4A, 4B and 4C interposed between upper support plate 80 and upper core plate 90 is a tubular support column 150 for supporting upper support plate 80 and for connecting upper support plate 80 to upper core plate 90. Support column 150 has an inside surface 160 for receiving a tubular instrumentation conduit 165, which is connected to inside surface 160 and coaxially disposed therein. Conduit 165 has an inside surface 167 for slidably receiving an instrumentation tube 170, which instrumentation tube 170 has at least one detector 180 attached therein for measuring core physics quantities (e.g., neutron flux). Support column 150 also includes an upper portion 185 matingly engaging aperture 130 so that support column 150 is laterally supported in aperture 130. Coaxially mounted atop upper portion 185 of support column 150 is a tubular support column extension 190 having an inside surface 200 for slidably receiving instrumentation tube 170 therealong. Support column extension 190 has external threads around an end thereof for threadably engaging the internal threads of aperture 130 so that support column extension 190 is threadably connected to upper support plate 80. Support column 150 also includes a lower portion 210 having a plurality of integrally attached outwardly extending feet 220 depending from lower portion 210 for resting support column 150 on top surface 110 of upper core plate 90. Each of the feet 220 is attached to upper core plate 90 by a fastener 230. Threadably connected to inside surface 160 of lower portion 210 may be a generally tubular instrumentation tube adaptor 240 for supporting conduit 165. Instrumentation tube adaptor 240 has an inside surface 245 for receiving conduit 165, which extends through instrumentation tube adaptor 240 and instrumentation tube hole 140.

Referring again to FIGS. 2, 3, 4, 4A, 4B and 4C disposed coaxially below instrumentation tube hole 140 (i.e., beneath upper core plate 90) and spaced apart therefrom is fuel assembly 70 comprising a plurality of vertically-oriented fuel rods 250 arranged in spaced parallel array. Each fuel rod 250 is received through an associated open lattice cell (not shown) formed in a fuel assembly grid 260. In this regard, each lattice cell frictionally engages each fuel rod 250 for securing each fuel rod 250 in grid 260. Also extending through a respective one of the lattice cells and approximately centrally disposed in fuel assembly 70 is an elongate vertically-oriented guide thimble tube 270 having an inside surface 280 for slidably receiving instrumentation tube 170. A plurality of grids 260 are axially spaced-apart along fuel assembly 70 for maintaining fuel rods 250 and guide thimble tube 270 in spaced parallel array. Fuel assembly 70 also includes a top nozzle 290 having an upwardly extending hold-down spring 300 attached to the top portion thereof. Hold-down spring 300 downwardly biases fuel assembly 70, as it engages core plate 90, so that fuel assembly 70 will not experience lift-off from a lower core plate 305 (see FIG. 1) that is spaced below upper core plate 90 and on which lower core plate 305 fuel assembly 70 rests. With reference to FIGS. 2, 3, 4, 4A, 4B and 4C, it will be readily understood that a gap or space exists .between upper core plate 90 and top nozzle 290. This space is large enough to allow the coolant to enter that space and impact instrumentation tube 170, which will have a portion thereof exposed to the coolant. As the coolant impacts instrumentation tube 170, the instrumentation tube 170 will experience lateral vibration. It is desirable to prevent or at least dampen (i.e., decrease the amplitude of) such vibration so that the core physics measurements obtained by detector 180 are accurate and so that instrumentation tube 170 will not experience premature wear due to vibration against the inner surfaces of instrumentation conduit 165 and guide thimble tube 270.

Therefore, referring to FIGS. 4, 4A, 4B, 4C, 5, 6, 6A, 7, and 8, there is shown a vibration dampener, generally referred to as 310, for dampening vibration of a tubular member, such as instrumentation tube 170. As disclosed more fully hereinbelow, vibration dampener 310 is attached to inside surface 245 of conduit 165 and also may be attached to inside surface 280 of guide thimble tube 270 for dampening vibration of instrumentation tube 170. In this regard, dampener 310 comprises a generally cylindrical sleeve 320 having an interior surface 330 for surrounding instrumentation tube 170 and an exterior surface 340 for matingly engaging inside surface 167 of conduit 165 or inside surface 280 of guide thimble tube 270. The interior and exterior surfaces 330/340 define an annular wall 350 therebetween. Sleeve 320 also has a first end 343 and a second end 345. Moreover, sleeve 320 is made of a material, such as zircaloy alloy or the like, having a relatively low microscopic absorption cross section for thermal neutrons so that sleeve 320 will not substantially parasitically absorb neutrons that might otherwise participate in the fission process. In this regard, sleeve 320 may be "ZIRCALOY-2" comprising, by weight percent, approximately 1.50% tin, 0.12% iron, 0.09% chromium, 0.05% nickel, and 98.24% zirconium.

Referring again to FIGS. 4, 4A, 4B, 4C, 5, 6, 6A, 7, and 8, sleeve 320 may include a pair of parallel elongate cut-outs or slots 360 therethrough. Slots 360 extend longitudinally in wall 350 from near first end 343 to near second end 345 of sleeve 320. Radially disposed opposite slots 360 (i.e., at an angle of approximately 180 degrees with respect to slots 360) and formed from wall 350 of sleeve 320 is support means, which may be a pair of dimples 370, for supporting instrumentation tube 170. Although in the preferred embodiment of the invention, dimples 370 are formed from wall 350, it will be appreciated that dimples 370 need not be formed from wall 350; rather, dimples 370 may be elements integrally attached, such as by welding, to interior surface 330 of wall 350. In either case, dimples 370 inwardly project from interior surface 330 for contacting or abutting instrumentation tube 170, so that instrumentation tube 170 is suitably supported thereby.

Still referring to FIGS. 4, 4A, 4B, 4C, 5, 6, 6A, 7, and 8, interposed between slots 360 is biasing means, such as an elongate spring member 380, for biasing instrumentation tube 170 into abutting engagement with dimples 370. It will be understood that spring member 380 is radially disposed at an angle of approximately 180 degrees with respect to dimples 370. That is, spring member 380 is interposed between slots 360, which slots 360 are themselves disposed opposite (i.e., approximately 180 degrees from) dimples 370, as previously described. Spring member 380 has a first end portion 390 integrally attached to wall 350 near first end 343 of wall 350. Spring member 380 also has a second end portion 400 integrally attached to wall 350 near second end 380 of wall 350. Moreover, spring member 380, which may be formed from wall 350, is inwardly-directed and is generally arch-shaped in transverse cross section. It will be understood that spring member 380 need not be formed from wall 350; rather, spring member 380 may be an element that is integrally attached, such as by welding, to interior surface 330 of wall 350. In addition, integrally attached to spring member 380 is a raised nodule 410 for contacting instrumentation tube 170 as instrumentation tube 170 vibrates against spring member 380. Nodule 410, which may be formed from spring member 380, is inwardly-directed and is generally arch-shaped in transverse cross section.

Referring yet again to FIGS. 4, 4A, 4B, 4C, 5, 6, 6A, 7, and 8, there may be a plurality of pairs of dimples 370 and a plurality of spring members 380 formed from wall 350. In the preferred embodiment of the invention, there are two pairs of dimples 370 and two spring members 380 that are formed from wall 350 of sleeve 320. That is, the second pair of dimples 370 may be radially disposed at an angle of approximately 90 degrees with respect to a first pair of dimples 370. Moreover, a second spring member 380 may be radially disposed at an angle of approximately 90 degrees with respect to a first spring member 380. It will be appreciated that having two pairs of dimples 370 and two spring members 380 disposed in the manner disclosed immediately hereinabove will allow the four dimples 370 and the two spring members 380 to apply radially symmetrical dampening forces to instrumentation tube 170. Applying radially symmetrical dampening forces to instrumentation tube 170 assists in re-centering instrumentation tube 170 coaxially along interior surface 330 as the vibration of instrumentation tube 170 is dampened and will also prevent instrumentation tube 170 from wearing against inside surfaces 167/280 of conduit 165 and thimble tube 270, respectively.

Figure 9:
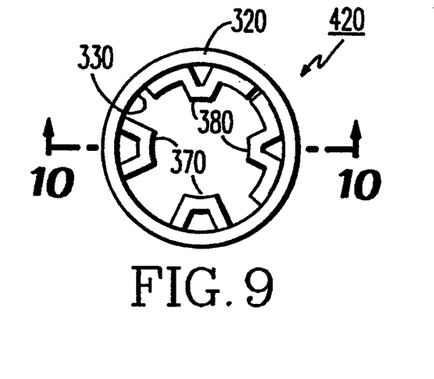
FIG. 9 shows a plan view of an alternative embodiment of the vibration dampener.
Figure 10:
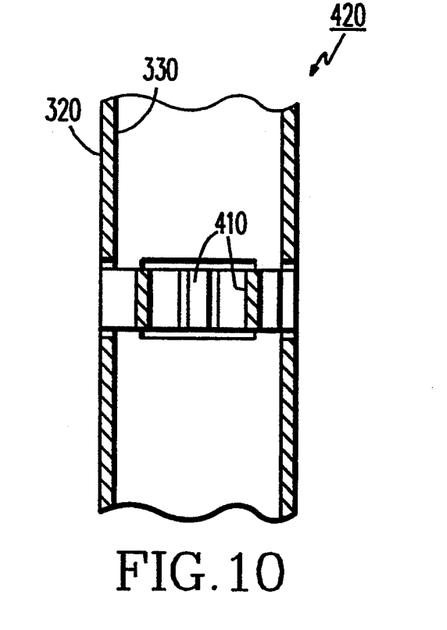
FIG. 10 is a view of the alternative embodiment of the vibration dampener taken along section line 10—10 of FIG. 9.

As best seen in FIGS. 9 and 10, there is shown an alternative embodiment of the invention, which is a vibration dampener, generally referred to as 420, for dampening the vibration of a tubular member, such as instrumentation tube 170. Vibration dampener 420 is substantially identical to vibration dampener 310 except that slots 360, spring member 320 and dimples 370 are formed circumferentially in wall 350 rather than being formed longitudinally in wall 350.

By way of example only, and not by way of limitation, sleeve 320 may be approximately five inches long and have an outside diameter of approximately 0.58 inches and a wall 350 thickness of approximately 0.04 inches for accommodating an instrumentation tube 170 having an outside diameter of approximately 0.54 inches. Each dimple 370 may have a length of approximately 0.27 inches and inwardly project approximately 0.04 inches from interior surface 330. In addition, each slot 360 may have a length of approximately 2.00 inches and a width of approximately 0.05 inches. Each spring member 380 may have a length of approximately 2.00 inches and inwardly project approximately 0.06 inches from interior surface 330. Moreover, nodule 410 may have a length of approximately 0.24 inches and inwardly project approximately 0.04 inches from spring member 380. Thus, it will be appreciated from the above description that the dimples and spring members reduce the effective inside diameters of conduit 165 and thimble tube 270 for dampening the vibration of instrumentation tube 170.

OPERATION

During operation of nuclear reactor 10, the liquid moderator coolant enters inlet nozzle 30 and circulates through reactor core 60 and through orifices 120 in upper support plate 90 and upper core plate 100. The coolant that circulates within vessel shell 20 eventually exits vessel shell 20 through exit nozzle 40, whereupon it is piped to a heat exchange device (not shown) for generating steam. The coolant mass flow rate in vessel shell 20 during normal operation may be relatively high, such as approximately 40,000 pounds mass per second. The coolant mass flow rate in vessel shell 20 during off-normal operation (e.g., seismic events and postulated accidents) may cause even higher flow rates. Such relatively high mass flow rates necessarily cause vibration of the reactor internal components, including instrumentation tube 170. This is so because the coolant will flow into the space defined between upper core plate 90 and top nozzle 290 and impact instrumentation tube 170. As the coolant impacts instrumentation tube 170, instrumentation tube 170 will vibrate at a given amplitude of vibration.

Unless mitigated, the undesirable vibration referred to hereinabove will radially displace instrumentation tube 170 away from its predetermined longitudinal axis such that in-core physics measurements (e.g., neutron flux measurements) taken by detector 180 may be inaccurate. Such in-core physics measurements will be inaccurate because the precise location of detector 180 may not be known due to the lateral displacement of detector 180, which displacement in turn is caused by the flow-induced vibration of instrumentation tube 170. It is desirable to precisely and accurately determine the location of detector 180 when it resides in core 60 in order to precisely determine the physics value at a predetermined location in core 60. For example, precise determination of the spatial distribution of neutron flux in core 60 allows a reactor operator to precisely determine the spatial distribution of the power level in core 60. As well known in the art of nuclear power production, it is important to determine the spatial distribution of the power level in order to suitably control the fission process and for other safety reasons.

Moreover, unless mitigated, the undesirable vibration referred to hereinabove will allow instrumentation tube 170 to vibrate against inside surface 167 of instrumentation tube adaptor 240 and also vibrate against inside surface 280 of guide thimble tube 270. This is undesirable because such unmitigated vibration may cause instrumentation tube 170 to experience premature wear as it vibrates against inside surfaces 167/280. Extreme premature wear of instrumentation tube 170 may increase the likelihood that a portion of instrumentation tube 170 will break-away and become a loose part within core 60, which is undesirable for safety reasons. Hence, the present invention dampens the vibration of instrumentation tube 170 so that instrumentation tube 170 will not experience premature wear as it vibrates in conduit 165 and guide thimble tube 270.

Therefore, as instrumentation tube 170 vibrates, it will tend to radially or outwardly translate out of its normal engagement with dimples 370 and thus away from its predetermined longitudinal axis. As instrumentation tube 170 outwardly moves away from its predetermined longitudinal axis, it will further engage and laterally move nodule 410, which belongs to spring member 380. As instrumentation tube 170 moves nodule 410 of spring member 380, spring member 380 will outwardly flex or bend a predetermined radial distance. The amount of flexing or bending of spring member 380 will be predetermined by the spring constant of spring member 380 and by the amplitude of vibration of instrumentation tube 170. As spring member 380 outwardly flexes due to the force exerted by instrumentation tube 170, it will simultaneously exert an inwardly-directed reaction force against instrumentation tube 170 sufficient to retard the outward movement of instrumentation tube 170 and thus decrease or dampen the amplitude of vibration of instrumentation tube 170. That is, as spring member 380 exerts the reaction force against instrumentation tube 170, instrumentation tube 170 will tend to return to its predetermined longitudinal axis within instrumentation tube adaptor 240 and guide thimble tube 270. As instrumentation tube 170 returns to its original axis, it will reengage or return into abutment with dimples 370 which radially support instrumentation tube 170. As instrumentation tube 170 abuts dimples 370, it will be re-centered within instrumentation tube adaptor 240 and guide thimble tube 270. In this manner, dimples 370 and spring member 380 will limit the amplitude of vibration of instrumentation tube 170 to a value that is less than its amplitude of vibration absent dimples 370 and spring member 380.

Although the invention is fully illustrated and described herein, it is not intended that the invention as illustrated and described by limited to the details shown, because various modifications may be obtained with respect to the invention without departing from the spirit of the invention or the scope of equivalents thereof. For example, although the preferred embodiment of the invention is disclosed with particular reference to dampening flow induced vibration of nuclear reactor core instrumentation tubes, the invention is suitable for use wherever dampening the vibration of any similar tubular member is desired, whether or not the vibration is flow-induced by operation of a nuclear reactor.

Therefore, what is provided is a vibration dampener for dampening the vibration of a tubular member, such as an instrumentation tube of the type typically found in nuclear power reactor pressure vessels.

What is claimed is:

1. In a nuclear reactor pressure vessel having a plurality of fuel assemblies disposed therein and having liquid coolant flowing through the pressure vessel, a vibration dampener for dampening flow-induced vibration of an instrumentation tube adapted to extend into an associated one of the fuel assemblies and adapted to slidably receive a flux measuring instrument therein for measuring the flux in the fuel assembly, the instrumentation tube defining a longitudinal axis therethrough and sized to be received in a tubular conduit capable of guiding the instrumentation tube into the fuel assembly, the tubular conduit having an inside surface for surrounding the instrumentation tube, comprising:

(a) a sleeve coaxially alignable with the instrumentation tube and connectable to the inside surface of the conduit and sized to be interposed between the conduit and the instrumentation tube, said sleeve defining a longitudinal axis therethrough, said sleeve having an interior surface for surrounding the instrumentation tube and an exterior surface for matingly engaging the inside surface of the conduit, the interior surface and the exterior surface of said sleeve defining an annular wall therebetween;

(b) a pair of coaxially-aligned inwardly-directed dimples integrally attached to the interior surface of said sleeve for supporting the instrumentation tube; and (c) an elongate inwardly-directed flexible spring member disposed radially opposite said dimples and formed from a pair of parallel slots cut through the wall of said sleeve and interposed between the slots for biasing the instrumentation tube into abutting engagement with said dimples, said spring member being disposed at an angle of approximately 180° with respect to said dimples, said spring member including:

(i) a first end portion and a second end portion thereof integrally attached to the wall; and (ii) an inwardly-directed raised nodule formed therefrom for contacting the instrumentation tube;

whereby as flow-induced vibration causes the instrumentation tube to radially outwardly translate out of coaxial alignment with said sleeve to further engage said spring member and disengage said dimples, said spring member radially outwardly flexes a predetermined distance after which the spring member radially inwardly flexes to bias the instrumentation tube into abutting relationship with said dimples so that the instrumentation tube is brought into coaxial alignment with said sleeve; and whereby as said sleeve and the instrumentation tube are brought into coaxial alignment, the vibration of the instrumentation tube is dampened.

2. The dampener of claim 1, further comprising:

(a) a second pair of dimples disposed at an angle of approximately 90° with respect to said first pair of dimples; and (b) a second pair of slots and a second spring member interposed therebetween, the second pair of slots and said second spring member disposed at an angle of approximately 180° with respect to said second pair of dimples.

3. The dampener of claim 1, (a) wherein the slots are cut longitudinally through the wall of said sleeve; and (b) wherein said spring member is interposed between the slots extends longitudinally in the wall of said sleeve.

4. The dampener of claim 1, wherein the slots and said spring member interposed therebetween extend circumferentially in the wall of said sleeve.

* * * * *